Feb. 11, 1958
R. L. UFFNER
2,822,724
PROJECTION METER
Filed Aug. 20, 1954
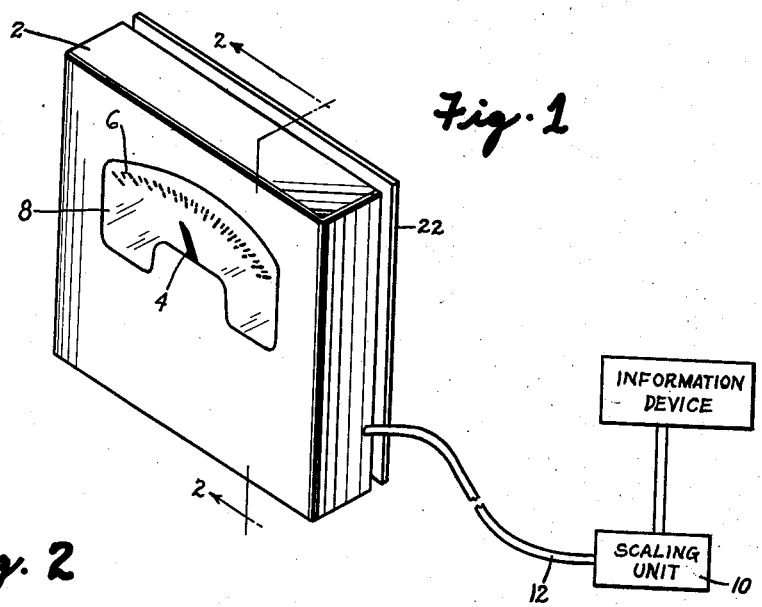
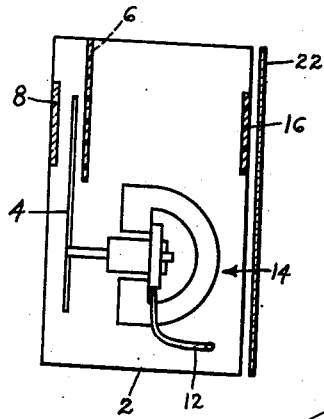
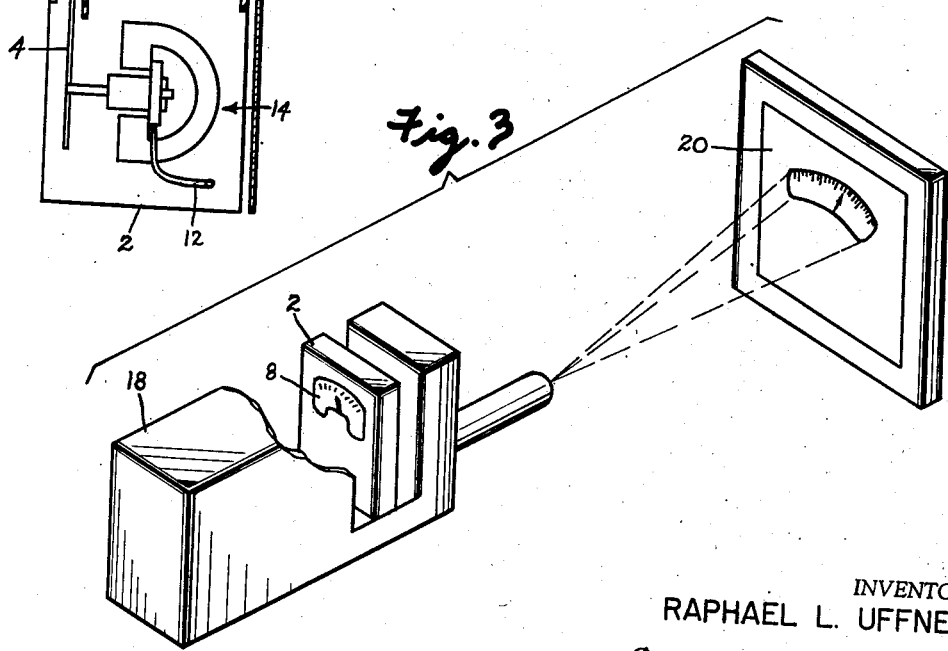
INVENTOR
RAPHAEL L. UFFNER
BY
ATTORNEYS

2,822,724

PROJECTION METER

Raphael L. Uffner, Flushing, N. Y., assignor to the United States of America as represented by the Secretary of the Navy Application August 20, 1954, Serial No. 451,320

3 Claims. (Cl. 88—24)

(Granted under Title 35, U. S. Code (1952), sec. 266)

The invention described herein may be manufactured and used by or for the Government of the United States of America for governmental purposes without the payment of any royalties thereon or therefor.

This invention relates, in general, to measuring devices and more particularly to a device that indicates a specific measured value directly or in adjustably enlarged dimensions without altering the accuracy of the readings or requiring elaborate adjustments.

Instruments that are in use today are mainly of the direct reading type. The instrument face is small and the divisions are fine. To read the meter, the observer must position himself directly in front of the meter and very close to it. Thus, it becomes obvious that the number of people that can view the meter reading at any particular instant is very limited. It is also obvious that it becomes a tedious job to continuously read, accurately, a direct reading meter.

The present invention consists of a standard meter movement that determines the position of an indicator. The indicator sweeps across a transparent scale plate that contains translucent or opaque divisions and numbers. The transparent plate is positioned between two other transparent plates wherein one of the plates is positioned within the front of the instrument and the other plate is positioned in the rear of the instrument. Thus, the scale plate and the front and rear panels of the meter box that line up with said scale plate are transparent. The meter is connected to an appropriate device such as a multi-tester, photo-electric cell or the like, and is read directly. The meter can also be inserted into any standard projector unit for enlargement of the dimensions of the scale plate to any practical size. The meter reading in its enlarged size, can be viewed by a relatively large number of people simultaneously, is easier to read and does not place any critical restrictions upon the observers.

Thus, a primary object of this invention is to provide a meter that can be read directly and can be enlarged by projection means and observed.

Another object is to provide a meter than can be read simultaneously by a multitude of people.

An additional object is to provide a meter that will indicate accurate readings regardless of the size of the enlargement of the scale.

Still another object is to provide a portable meter that can be enlarged, by projection means, to any convenient size without disturbing the critical setting of the indicator relative to the scale.

Other objects and many of the attendant advantages of this invention will be readily appreciated as the same becomes better understood by reference to the following detailed description when considered in connection with the accompanying drawings wherein:

Figure 1 is an isometric view of a meter connected to a scaling unit and being utilized as a direct reading unit, showing a preferred embodiment of the invention, Figure 2 is a section taken along a vertical plane at 2—2 of Figure 1, showing the meter scale between the two transparent windows, and Figure 3 is a view wherein the meter is utilized in conjunction with a projector to generate an enlarged view of the meter scale.

A box 2 contains a standard meter movement 14 adapted to orient a pointer or indicator 4, a transparent dial or face 6 containing translucent or opaque nomenclature or markings and located behind said pointer, and a transparent window or front plate 8 located in front of said pointer. A conventional scaling unit 10 is electrically connected to the meter movement of the unit 2 through the wires 12. The scaling unit can be a multiplicity of shunts and multipliers for the scaling of alternating and direct current and voltage measurements. Alternatively, the scaling unit can be operated through a photoelectric cell for the scaling of electrical response to light intensity, or a small generator for the translation of rotational or linear speed or the like into a measurable electrical value. Thus, by the utilization of the proper scales on the face plate 6 and the appropriate scaling unit 10, numerous electrical or physical quantities that can be converted into electrical quantities can be detected and measured.

The box 2 contains the standard meter movement 14 that is of the required sensitivity and is electrically connected to the scaling unit 10 through wires 12. The indicator 4 is connected to and controlled by the meter movement 14 and sweeps across the scaled transparent dial 6. A transparent window or front plate 8 is located behind an appropriate cutout or window in the front of the box 2. Another transparent window or back plate 16 that is slightly larger than said first mentioned window or face plate 8 is located adjacent to another appropriate cutout or window in the back of the box. 2. The transparent windows 8 and 16 are composed of clear glass, or plastic or the like. The transparent windows are positioned in substantially alignment and cooperate with the indicator 4 and the scale 6. The glass windows help keep the interior of the box 2 and the meter movement 14 relatively free of dust and dirt, and allow for the passage of light through the unit for projection readings, and also allow for the passage of light through the unit for direct readings.

Figure 3 shows the complete meter unit 2 in use with a standard projector 18 and a standard screen 20. (The scaling unit and the device that is being checked is not shown in Figure 3.) The meter unit is inserted in the projection device 18 as illustrated. The projection device is then turned on and adjusted so that the projected image of the scale reading of the meter unit 2 is of the desired size and is in focus on the screen 20.

The light from the projector passes through parts 8, 6, and 16 of the unit 2, with the opaque markings on dial 6 and the opaque indicator 4 being clearly shown on the screen 20.

Thus it becomes apparent that this device can be utilized in demonstrations to groups of people, or in industry where the observer must constantly check a measured value and continue to perform other functions.

This device can also be used as a direct reading instrument by placing a backing 22, as illustrated in Figure 2, over the rear window 16. The backing should be of a shade or color that contrasts with the divisions and information that is on the dial 6. The backing 22 can be attached to the box 2 by any convenient means that will permit easy removal such as snaps, clips, slides, hooks and the like.

In the operation of this device, the meter box 2 is connected to the device that is being checked through an appropriate scaling unit 10. The reading is then read directly from the box 2, or said reading is enlarged and then read from the screen 20. Before the reading of the box 2 can be enlarged, the cover 22 must be removed from the back window 16.

Obviously many modifications and variations of the present invention are possible in the light of the above teachings. It is therefore to be understood that within the scope of the appended claims the invention may be practiced otherwise than as specifically described.

What is claimed is:

1. A measuring instrument comprising a transparent face plate containing indicia; a meter movement; an opaque indicator coupled to said meter movement and adapted to traverse a path across said indicia; an opaque envelope enclosing said face plate and said indicator; a first transparent window in said envelope oriented to expose such indicia; a second transparent window in said envelope aligned with said first window; and an opaque flexible cover removably secured proximate said second window to contrast with said indicia for direct reading of the instrument, said face plate, indicator, opaque element and opaque means mounted together to form an integrated portable measuring instrument adapted for direct reading or projection viewing by light projected through said windows and face plate.

2. A measuring instrument comprising a transparent face plate marked with opaque scale indicia, a meter movement, an opaque indicator coupled to said meter movement and adapted to traverse said indicia, an opaque element enveloping said face plate and said indicator, a first window in said envelope oriented to expose said indicator and said scale indicia side of said face plate, a second window in said envelope oriented to expose the other side of said face plate, rigid opaque means secured removably to said second window to allow said instrument to be viewed directly through said first window by presenting a contrasting background for said indicator and said scale indicia, and slide projection means coupled optically to said face plate and said indicator to project an enlarged view of said indicia and said indicator, said face plate, indicator, opaque element and opaque means mounted together to form an integrated portable measuring instrument adapted to direct reading or projection viewing by light projected through said windows and face plate.

3. An integrated, portable meter adapted for both direct and projection viewing comprising: a meter movement; a transparent dial marked with scale indicia; an indicator coupled to and adapted to be moved by said meter movement across said dial for positioning with respect to said scale indicia; and a housing for said meter movement, dial and indicator, said housing being formed with windows in opposite sides thereof, and said dial being optically aligned with said windows so that light projected through said windows also passes through said dial, said meter movement, indicator and dial being mounted together to form an integrated meter suitable for direct reading and for projection viewing by means of light projected through said dial.

References Cited in the file of this patent

UNITED STATES PATENTS

| | | |
|---|---|---|
| 1,074,260 | Guerrant | Sept. 30, 1913 |
| 1,075,789 | Patton | Oct. 14, 1913 |
| 1,096,122 | Partington | May 12, 1914 |
| 1,357,731 | Schaper | Nov. 2, 1920 |
| 1,579,880 | Meissner et al. | Apr. 6, 1926 |
| 1,893,421 | Latzko et al. | Jan. 3, 1933 |
| 1,928,001 | Aldeborgh et al. | Sept. 26, 1933 |
| 1,935,070 | Walther | Nov. 14, 1933 |
| 2,019,234 | Nistri | Oct. 29, 1935 |
| 2,169,010 | Teague | Aug. 8, 1939 |
| 2,178,637 | Link | Nov. 7, 1939 |
| 2,351,238 | Teuber | June 13, 1944 |
| 2,486,425 | Lowe et al. | Nov. 1, 1949 |
| 2,655,810 | La Coe | Oct. 20, 1953 |
| 2,676,515 | Diehl | Apr. 27, 1954 |